May 3, 1927.
R. B. SCOTT
1,627,122
CONDUIT CLEANER
Filed Aug. 26, 1926
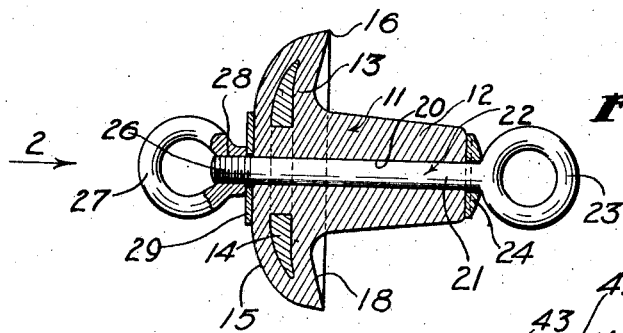
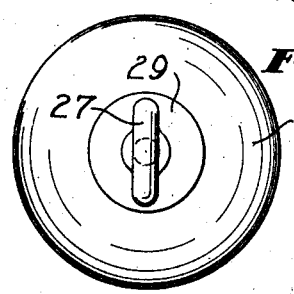
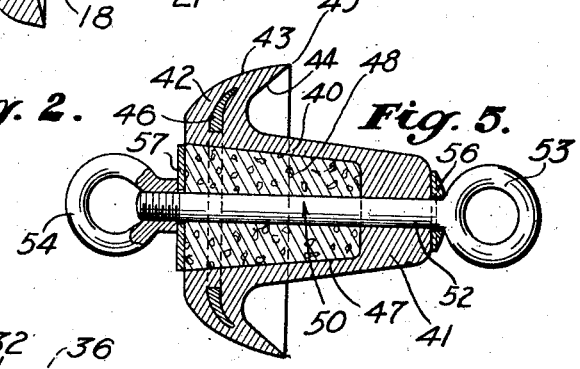
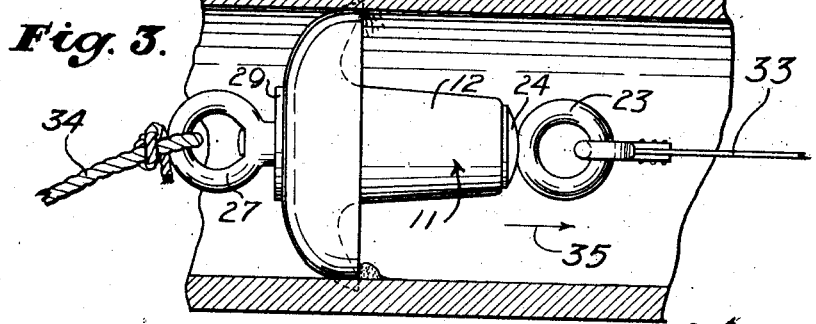
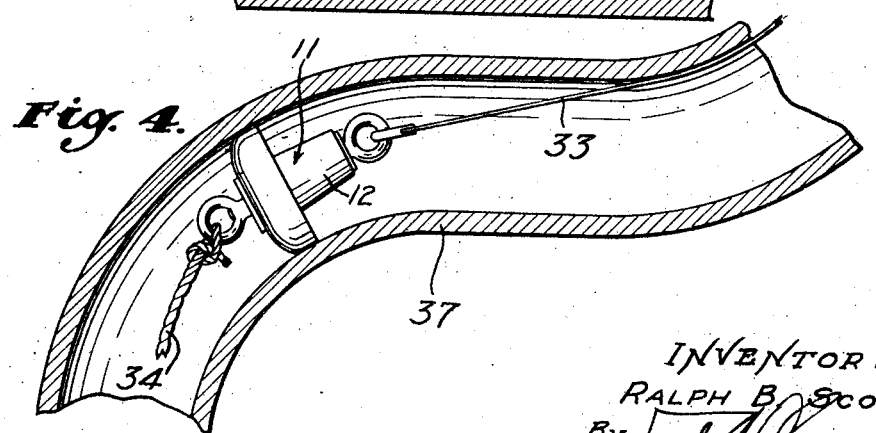
INVENTOR:
RALPH B. SCOTT
By *Fad Alaui*
ATTORNEY Patented May 3, 1927.

1,627,122

UNITED STATES PATENT OFFICE.

RALPH B. SCOTT, OF LOS ANGELES, CALIFORNIA.

CONDUIT CLEANER.

Application filed August 26, 1926. Serial No. 131,570.

My invention concerns a device for cleaning conduits through which electric wires are passed.

City ordinances require that all electric wires in buildings to be enclosed by metal conduits so as to make fire hazards as small as possible. After the main structure of a building is completed and before the finishing work is commenced, outlet boxes and conduits are installed. The electric wires are then pulled through the conduits by use of a flexible member known in the electrical trade as a "snake." Before the wires can be extended through the conduits, the conduits must be cleaned out. This cleaning is at present accomplished by use of a swab, formed of rags, which is secured to one end of a wire extended through the conduit to be cleaned. The wire is then pulled through the conduit, the rag swab being pulled therewith. This form of conduit cleaner is unsatisfactory for various reasons. In the first place, the rag swab does not last very long because it is cut severely by the interior of the conductor and the foreign matter therein. Another disadvantage is that the rag swab quickly becomes ineffective if there is any moisture in the conduit because the rags become saturated with the moisture. One of the biggest objections to the form of cleaner in discussion is that it very often becomes jammed in the conduit and is difficult to remove, requiring a tedious manipulation of the pull wire.

It is an object of this invention to provide a conduit cleaner which will thoroughly clean a conduit and which is durable.

A further object of the invention is to provide a conduit cleaner which may be readily removed in the event that any jamming occurs in the conduit.

Other objects and advantages will be emphasized throughout the following description.

Referring to the drawing in which I illustrate the invention,

Fig. 1 is a cross section through a conduit cleaner embodying the features of the invention.

Fig. 2 is an end view taken as indicated by an arrow 2 of Fig. 1.

Fig. 3 is a view illustrating the conduit cleaner in use in a straight conduit.

Fig. 4 is a view showing the manner in which the conduit cleaner is pulled around a bend in a conduit.

Fig. 5 is a sectional view of an alternative form of the invention.

Referring to Figs. 1 and 2 of the drawing, the conduit cleaner has a body 11 which is formed preferably of rubber or rubber composition, but may be made of any other suitable material having the required characteristics which will be made evident hereinafter. The body 11 has an elongated boss 12 which is externally tapered as shown. Formed at one end of the boss 12 is an annular flange 13 which is provided with a reinforcement 14. The reinforcement 14, although not essential in some sizes of pipe cleaners, is desirable on larger sizes for reinforcing the flange. The reinforcement may be made of a hard rubber composition or may be made of metal. The flange 13 has a back face 15 which is curved forward towards the boss 12, the outer and forward part thereof terminating in an annular contact edge 16. The flange 13 has a front face 18 which is annular and formed non-parallel with the plane in which the contact edge 16 is placed. The front face 18 recedes rearwardly as shown so as to provide the contact edge 16 with a slight keenness.

Formed on the axis of the body 11 is an opening 20 through which a bar portion 21 of an attachment fixture 22 is extended. Formed integral at one end of the bar 21 is an attachment formation in the form of a ring 23. A washer 24 is placed between the forward end of the boss 12 and the attachment ring 23. The left end of the bar 21 extends outward from the body 11 and is threaded as indicated at 26. Threadedly secured on the threaded end 26 is an attachment formation in the form of a removable attachment ring 27 which is provided with a threaded opening 28 into which the end of the bar 21 is received. A washer 29 is placed between the attachment ring 27 and the left end of the body 11.

In Fig. 3, I show a conduit 32 in the process of being cleaned by the conduit cleaner of my invention. Attached to the integral attachment ring 23 at the forward end of the cleaner is a flexible member 33 and attached to the removable attachment ring 27 is a flexible member 34. The conduit cleaner is pulled through the conduit 32 by the flexible member 33 in a direction indicated by an arrow 35 of Fig. 3. The diameter of the contact edge 16 is slightly larger than the internal diameter of the conduit 33; therefore, this contact edge is pressed inward from a position indicated by dotted lines 36 in Fig. 3 into the position shown by full lines. This compression of the contact edge causes it to pressurally engage the inner face of the conduit 32 and, therefore, to thoroughly clean it.

In using the invention, the flexible member 33 is first extended through the conduit 32 and the conduit cleaner is then pulled through the conduit as indicated by the arrow 35. In event that the conduit cleaner should for any reason be jammed in the conduit 32, it may be removed by pulling it in a reverse direction through the conduit. This is accomplished by the flexible member 34 which is attached to the back part of the conduit cleaner. It is not absolutely necessary to have the conduit cleaner resting in the position shown in Fig. 3; that is, so that the axis thereof is parallel to the axis of the conduit. It may be skewed one way or the other without greatly affecting the operation of the conduit cleaner. This is because of the fact that the back face 15 is of such a curvature that even though the conduit cleaner is slightly skewed from the position shown in Fig. 3, the contact edge 16 will still remain in tight and continuous contact with the inner face of the conduit.

In Fig. 4 I show the conduit cleaner being pulled around a bend of a conduit 37. When passing around a bend the axis of the conduit cleaner will probably be out of alignment with the instantaneous axis of the conduit, but as previously pointed out, this will not detract from its efficient operation because the contact edge 16 will still remain in proper cleaning engagement with the inner face of the conduit. The conduit cleaner of the invention is so constructed that there is but small liability of the jamming in a conduit and there will, therefore, be little difficulty from this source of trouble. The conduit cleaner is very durable since it is made of a tough resilient substance. Moisture in the conduit will have no effect on the cleaning abilities of the conduit cleaner because the rubber is not affected by moisture.

In Fig. 5 I show an alternative form of my invention. This form of the invention consists of a body 40 having a tapered boss 41 and an annular flange 42 formed at one end of the boss 41. A flange 42 has rear and front faces 43 and 44 which terminate in an annular contact edge 45. This form of the invention may also be provided with a reinforcement 46. The boss 41 is provided with a concentric cavity 47 which connects to the left end thereof. Placed in the cavity 47 is a filler 48 which may be in the form of a plug formed of cork, wood, or any other material which is cheap. This form of the invention saves considerable rubber by hollowing out a boss 41, this hollow or cavity being filled by a material which is much cheaper than rubber. This form of the invention has an attachment fixture 50 which is identical with the attachment fixture 21, having a bar 52, an integral attachment ring 53 and a removable attachment ring 54. Washers 56 and 57 are provided between the two attachment rings and the ends of the body 40.

I claim as my invention:

1. A conduit cleaner comprising: a tough resilient body having a boss elongated on the axis of said body, and an annular flange, said annular flange having a rear convex face and a front face which faces meet to form an annular and continuous contact edge; and means for connecting pull wires to said conduit cleaner.

2. A conduit cleaner comprising: a tough resilient body having a boss elongated on the axis of said body, and an annular flange, said annular flange having a rear convex face and front face which faces meet to form an annular and continuous contact edge; a reinforcement in said flange; and means for connecting pull wires to said conduit cleaner.

In testimony whereof, I have hereunto set my hand at Los Angeles, California, this 20th day of August, 1926.

RALPH B. SCOTT.